(12) United States Patent
Bower et al.

(10) Patent No.: US 8,306,978 B2
(45) Date of Patent: Nov. 6, 2012

(54) METHOD OF CHANGING THE PAGE SIZE OF A DB2 TABLE SPACE WHILE KEEPING THE OBJECT AVAILABLE

(75) Inventors: Frank Darl Bower, San Jose, CA (US); Roy J. Comford, Hants (GB); Karelle Lynne Cornwell, Campbell, CA (US); William James Franklin, San Ramon, CA (US); Saiyin Leung, San Jose, CA (US); John Richard Lyle, Morgan Hill, CA (US); James Zu-Chia Teng, San Jose, CA (US); Jay A Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/171,510

(22) Filed: Jul. 11, 2008

(65) Prior Publication Data

US 2008/0270492 A1    Oct. 30, 2008

Related U.S. Application Data

(63) Continuation of application No. 10/711,826, filed on Oct. 7, 2004, now Pat. No. 7,447,717.

(51) Int. Cl.
*G06F 7/00* (2006.01)
*G06F 17/30* (2006.01)
(52) U.S. Cl. ......... 707/736; 707/756; 707/802; 707/812
(58) Field of Classification Search .................. None
See application file for complete search history.

(56) References Cited

U.S. PATENT DOCUMENTS

| | | | |
|---|---|---|---|
| 5,222,235 A | 6/1993 | Hintz et al. | |
| 5,396,623 A | 3/1995 | McCall et al. | |
| 5,625,815 A | 4/1997 | Maier et al. | |
| 5,717,885 A * | 2/1998 | Kumar et al. | 711/207 |
| 5,758,337 A * | 5/1998 | Hammond | 1/1 |
| 5,806,075 A * | 9/1998 | Jain et al. | 1/1 |
| 5,887,274 A | 3/1999 | Barry et al. | |

(Continued)

FOREIGN PATENT DOCUMENTS

WO    WO02/098048    12/2002

(Continued)

OTHER PUBLICATIONS

Schiefer et al., "DB2 Universal Database Performance Turning," Bulletin of the Technical Committee on Data Engineering, IEEE Computer Society, Jun. 1999, V22, N2, pp. 12-19.

(Continued)

*Primary Examiner* — Jay Morrison
(74) *Attorney, Agent, or Firm* — IP Authority, LLC; Ramraj Soundararajan

(57) ABSTRACT

Provided is a method for online reorganization and increasing the page size of a DB2 object. A base table and related auxiliary table spaces are reorganized concurrently via a database utility, DB2 REORG utility. The database utility determines which auxiliary tables are related to the base table and automatically includes their respective auxiliary table in the same invocation of the utility. The reorganization is performed via allocated shadow data sets; page size of the allocated shadow data sets is dynamically updated during reorganization. The original data sets are switched with the newly built shadow data sets, and DB2 catalog values and control blocks are updated with new page size values.

6 Claims, 2 Drawing Sheets

U.S. PATENT DOCUMENTS

| | | | |
|---|---|---|---|
| 6,122,640 | A | 9/2000 | Pereira |
| 6,144,970 | A | 11/2000 | Bonner et al. |
| 6,182,089 | B1 * | 1/2001 | Ganapathy et al. .................. 1/1 |
| 6,343,296 | B1 | 1/2002 | Lakhamraju et al. |
| 6,460,048 | B1 | 10/2002 | Teng et al. |
| 6,519,613 | B1 | 2/2003 | Friske et al. |
| 6,535,893 | B1 | 3/2003 | Friske et al. |
| 6,535,895 | B2 | 3/2003 | Bonner et al. |
| 6,591,269 | B1 | 7/2003 | Ponnekanti |
| 6,606,631 | B1 | 8/2003 | Martin, Jr. et al. |
| 6,694,340 | B1 | 2/2004 | Lyle et al. |
| 6,738,388 | B1 | 5/2004 | Stevenson et al. |
| 6,745,211 | B2 | 6/2004 | Kabasakalian et al. |
| 6,965,899 | B1 | 11/2005 | Subramaniam et al. |
| 7,389,305 | B1 * | 6/2008 | Kindig et al. ......................... 1/1 |
| 7,788,243 | B2 * | 8/2010 | Pasupuleti et al. ............ 707/704 |
| 2001/0047360 | A1 | 11/2001 | Huras et al. |
| 2002/0143743 | A1 | 10/2002 | Iyer et al. |
| 2003/0046294 | A1 | 3/2003 | Heronimus |
| 2003/0056082 | A1 | 3/2003 | Maxfield |
| 2003/0115220 | A1 | 6/2003 | Chan et al. |
| 2003/0130985 | A1 | 7/2003 | Driesen et al. |
| 2003/0135478 | A1 | 7/2003 | Marshall et al. |
| 2004/0015469 | A1 | 1/2004 | Beier et al. |
| 2005/0251523 | A1 | 11/2005 | Rajamani et al. |

FOREIGN PATENT DOCUMENTS

| | | |
|---|---|---|
| WO | WO03009180 | 1/2003 |

OTHER PUBLICATIONS

"Technique to Allow DB2 Utilities and Commands to Run While SQL Applications have a Table Space Locked," IBM TDB, V36, N9A, Sep. 1993, pp. 499-501.

"Online Reorg," <http://www.alancsmith.co.uk.db2/olro/onlinero.html>.

Sockut et al., "Database Reorganization—Principles and Practices," Computing Surveys, Dec. 1979, V11, N4, pp. 371-95.

* cited by examiner

METHOD OF CHANGING THE PAGE SIZE OF A DB2 TABLE SPACE WHILE KEEPING THE OBJECT AVAILABLE

RELATED APPLICATIONS

This application is a continuation of U.S. application Ser. No. 10/711,826, filed Oct. 7, 2004, pending.

BACKGROUND OF THE INVENTION

1. Field of Invention

The present invention relates generally to the field of memory allocation and organization in relational databases. More specifically, the present invention is related to reorganizing object memory and increasing page size allocations.

2. Discussion of Prior Art

As is commonly defined in database applications, a database consists of sets referred to and displayed as tables. In turn, tables consist of records which are referred to and displayed as rows of a table. Lastly, each row consists of individual data fields known as columns. As data fields, rows, and columns are added and deleted from tables, the probability increases for data that is logically sequential in nature to be stored on pages that are physically non-sequential. This leads to sub-optimal performance, as additional read operations become required to access non-sequentially stored data. As tables are updated with deletions and insertions, performance degradation also occurs through the fragmentation of leaf pages, badly clustered indices (i.e. when the physical index page no longer matches the sequence of keys on a current page), and an index developing a less than optimally efficient number of levels. Fragmentation of leaf pages leads to increasing input/output (I/O) costs as more leaf pages must be read to fetch pages corresponding to a single, designated table. Additionally, when leaf pages are badly clustered, sequential pre-fetching is inefficient and results in more I/O waits.

Furthermore, when an object is created in a database, the page size allocated for the object is chosen as well. As the object increases with size, either through the addition of columns or rows, the initially allocated page may no longer be adequate to store the entire object. As a result, it is frequently necessary to re-allocate a page of appropriate size for a table. Re-allocation of a page requires unloading and reloading data from each individual data field in the table, making new image copies of the table, and re-granting previous authorizations. While these operations are in progress, the table object is unavailable for substantial periods of time.

Prior art attempts of changing an initially allocated page size are recited in patent literature. U.S. Patent application publication 2003/0115220 teaches the editing of a production data store by shadowing content. In this method, changing a page size changes the production data store by making a shadow the permanent production data store and also updating the databases control blocks to reflect the new page size. However, this method is limited in that only the shadow is modified; no change is made to the permanent production data store.

International patent application publication WO 02/098048 discloses a method for performing an online reorganization of a database. However, the method is limited in that it does not describe changing the attributes of the physical object.

U.S. patent application publication 2003/0130985 discloses a method for upgrading a database with a shadow system. This method references two separate systems operated in parallel; the shadow system is updated via trigger reports from the main system. The method for changing page size only works on a single system. Processing occurs on an original page set in the main system until a switch to the shadow system occurs. Therefore, if updates are allowed during the reorganization process, then both original page set and shadow are updated.

As is shown, prior methods of changing page size fail to teach or suggest a method for dealing with the problems and performance degradation associated with fragmentation and badly clustered indices.

Whatever the precise merits, features, and advantages of the above cited references, none of them achieves or fulfills the purposes of the present invention.

SUMMARY OF THE INVENTION

The method of the present invention provides for the reorganization of a table space to improve access performance and reclaim fragmented space. A database reorganization utility (hereafter, DB2 REORG) is utilized to write rows that are added to a designated object, to a larger page. In this manner, the designated object would remain available, would not require recreation, nor would existing DB2 authorizations be deleted. By reorganizing table space such that constituent rows are read from existing pages and then copied to larger pages, which will subsequently be externalized, the requirement to take the designated object offline while changing the page size is obviated. Subsequent to table reorganization, DB2 control blocks along with the DB2 catalog are updated to reflect the change in page size.

An exemplary embodiment comprises the steps of: (a) blocking write access to data being reorganized; (b) identifying object table spaces that are related to the table space being reorganized; (c) concurrently creating a shadow data set for each of the object table spaces and a shadow data set for the table space and associated indexes; (d) loading rows into shadow data sets, and for each row loaded, reading objects from each of object table spaces relating to a loaded row and writing the read object to a corresponding shadow data set; (e) switching original data set with shadow data sets; and (f) allowing write operations related to data being organized to proceed.

In using the DB2 REORG warehouse utility to increase page size, a decrease in performance degradation due to fragmentation is also affected. Database reorganization utilities allow one to rearrange a table in physical storage, thereby eliminating fragmentation and ensuring efficient storage in a database. The DB2 REORG utility is also used to compact data and control the order in which constituent rows of a table are stored, in most cases according to an index value on physically contiguous pages. During the reorganization process, information about the current progress of table reorganization is written to the history file for database activity. The history file contains a record for each reorganization event. Additionally, table snapshots are used to monitor the progress of reorganization. In a production environment, data remains available and users maintain read and write access to a designated table while indices are being rebuilt.

The DB2 REORG utility is such that changes made to an underlying table with the potential to affect indices while the reorganization is in progress, are logged. In addition, changes made during reorganization are placed in internal memory buffer space, if any such memory space exists. The internal memory buffer space is a designated memory area allocated on demand from the utility heap to store the changes to the object being created or reorganized. The use of the memory buffer space allows object reorganization by initially reading directly from memory, and if necessary, by later accessing change logs. Allocated memory is freed upon completion of reorganization. Subsequently, the DB2 reorganization utility processes change logs to maintain current writing activity.

Additionally, the method of the present invention occurs in a single step; as additional data (e.g., rows or columns) are written to an object (e.g., a table) it is also being simultaneously written to a larger page. Data comprising the designated object is therefore available for read access throughout a majority of the process.

DESCRIPTION OF THE PREFERRED EMBODIMENTS

Figure 1:
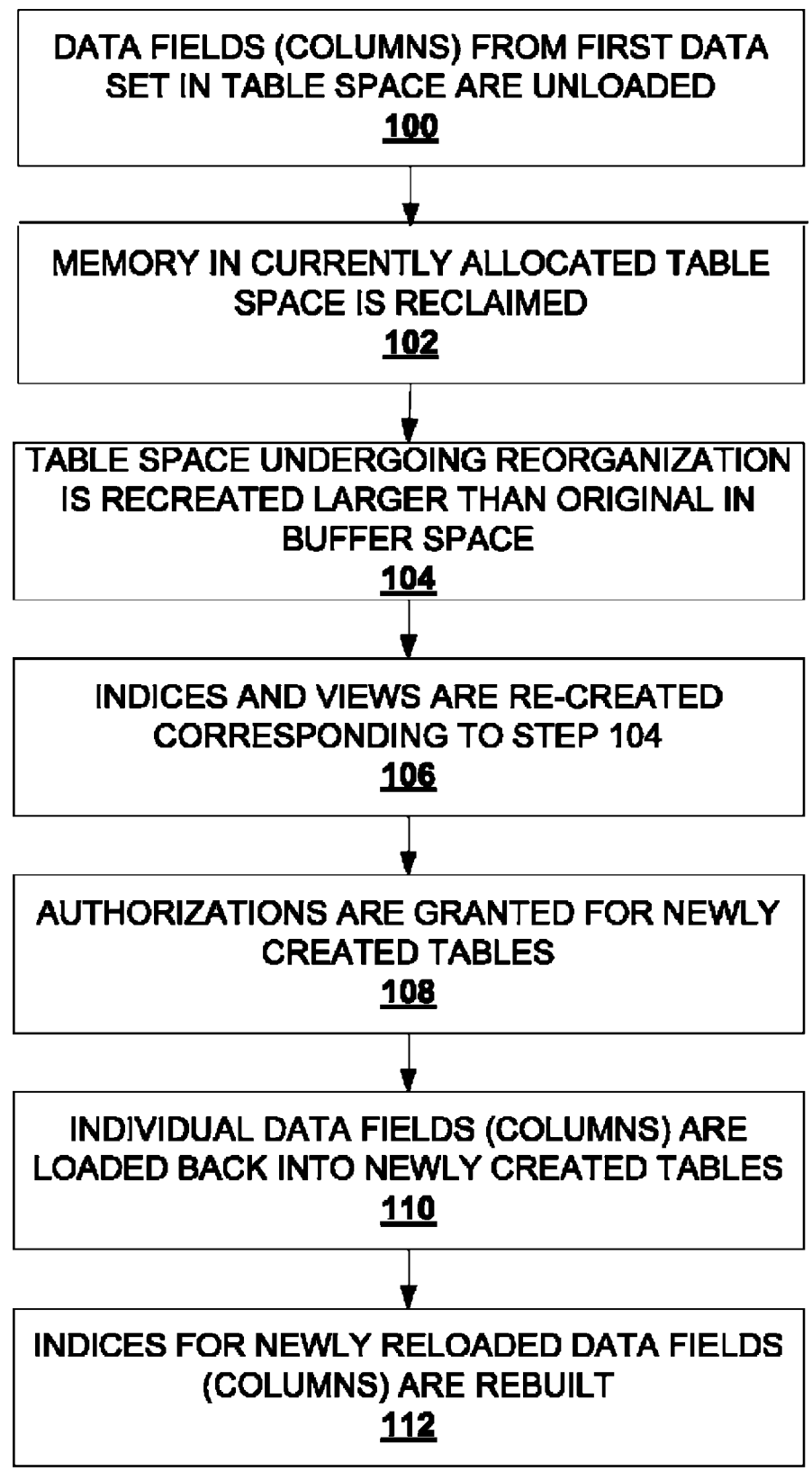
FIG. 1 illustrates a prior art method of changing the page size of an existing DB2 table space.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The current DB2 REORG utility works by: allocating "shadow" data sets for each table space and its indexes; blocking write access to the data; unloading rows from the original tables space; sorting the rows; loading the rows into the shadow data sets and extracting index keys for each row as it is loaded; sorting the index keys; building the indexes from the sorted index keys; switching the original data sets with the shadow data sets; and allowing write operations to proceed.

Shown in FIG. 1 is the prior art method of changing the page size of an existing a DB2 table space is shown. In step 100, individual data fields from a designated object from a currently selected table space is unloaded. Data in these fields are held until they are written to another page. To "drop", or reclaim the memory allocated for the currently selected table space in step 102, it is necessary to identify existing authorization for tables in the currently selected table space and also to identify existing indices on tables in the currently selected table space. Subsequently in step 104, the table space is re-created in a buffer corresponding to a larger page size. Tables that originally existed in the original table space are re-created in the new table space, as are indices and views for each of the tables in the dropped table space in step 106. Authorizations for the newly created tables are granted in step 108, and in step 110, individual data fields are loaded into the recreated tables. The process completes in step 112 with rebuilding indices for newly reloaded data. In this process, it is important to note that data is unavailable from the time that the table space is dropped in step 102 until after indices are rebuilt in step 112. Additionally, each of these steps must occur sequentially and manually.

Figure 2:
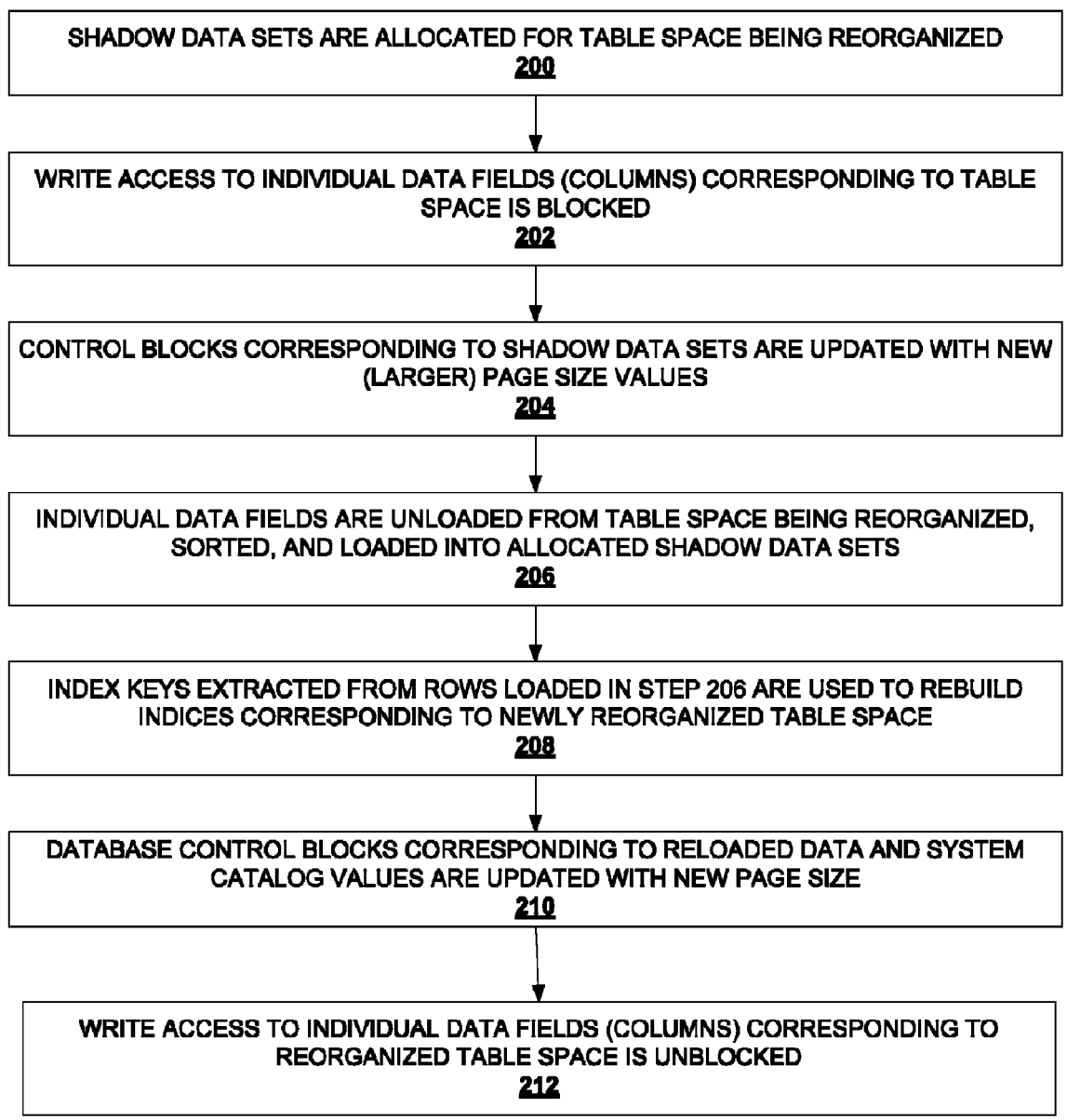
FIG. 2 illustrates the method of the present invention for changing the page size of an existing DB2 table space.

Referring now to FIG. 2, the method of the present invention is shown. The DB2 REORG utility is used to put sorted rows into larger pages and subsequently, to externalize them. The DB2 REORG utility creates shadow data sets for the table space and, at the same time, creates shadow data sets for the indexes. In step 200, the process begins by allocating shadow data sets for each of the designated table spaces and indices. Subsequently, write access to individual data fields of designated table spaces is blocked in step 202. Following, in step 204, shadow control blocks are updated with new page size values. In step 206, rows are unloaded from their original table spaces, sorted, and loaded into shadow data sets; index keys for each row are also extracted as each row is loaded. From index keys sorted in step 206, indices are built in step 208. During the former steps of the method of the present invention, data in table spaces undergoing reorganization is available for reading. In step 210, DB2 control blocks and catalog are updated to reflect the updated page size. Finally, shadow data sets are switched original data sets in step 212, and write operations are allowed to proceed.

Additionally, the present invention provides for an article of manufacture comprising computer readable program code contained within implementing one or more modules to update page size concurrent with the reorganization of database table space. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) allocating shadow data sets for each of the table spaces and indexes; (b) blocking write access to the data; (c) updating allocated shadow data sets with new page size values; (d) unload rows from the original table spaces; (e) sorting and loading the rows into the shadow data sets, extracting index keys for each row as it is loaded; (f) building indices from sorted index keys; (g) updating DB2 control blocks and catalog with new page size values; and (h) switching the original data sets with the shadow data sets.

CONCLUSION

A method has been shown in the above embodiments for the effective implementation of changing the page size of a DB2 table space while allowing the availability of the object. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of object-oriented programming.

The invention claimed is:

1. A method for reorganizing a designated object of a database that has exceeded a current page size, said method comprising the steps of:
   a) writing to a larger page, rows added to said designated object in said database; said writing based on recency information, said database comprising a plurality of index values and a system catalog, said system catalog comprising at least control information;
   b) permitting continual access to said designated object during said writing step;
   c) reading constituent rows from a plurality of existing pages corresponding to said designated object and subsequently copying said constituent rows to said larger page;
   d) externalizing said designated object; and
   e) updating said control information reflecting said change in page size corresponding to said externalized designated object.

2. The method of claim 1, wherein during said copying, constituent rows of said designated object are re-arranged in physical storage to eliminate fragmentation.

3. The method of claim 1, wherein during said copying, data in said constituent rows is compacted and is stored, on contiguous pages in physical storage, in accordance with one of said plurality of index values.

4. An article of manufacture comprising a computer storage medium having computer readable program code embodied therein which implements the reorganization of a designated object of a database that has exceeded a current page size; said medium comprising:
   a) computer readable program code writing to a larger page, rows added to said designated object in said database; said writing based on recency information, said database comprising a plurality of index values and a system catalog, said system catalog comprising at least control information;
   b) computer readable program code permitting continual access to said designated object during said writing step;
   c) computer readable program code reading constituent rows from a plurality of existing pages corresponding to said designated object and subsequently copying said constituent rows to said larger page;
   d) computer readable program code externalizing said designated object; and
   e) updating said control information reflecting said change in page size corresponding to said externalized designated object.

5. The article of manufacture of claim 4, wherein during said copying, constituent rows of said designated object are re-arranged in physical storage to eliminate fragmentation.

6. The article of manufacture of claim 4, wherein during said copying, data in said constituent rows is compacted and is stored, on contiguous pages in physical storage, in accordance with one of said plurality of index values.

* * * * *